G. AKERS.
END GATE OPERATING MECHANISM.
APPLICATION FILED DEC. 1, 1919.

1,394,521.

Patented Oct. 25, 1921.

INVENTOR
Glen Akers.
BY
H. E. Dunlap
ATTORNEY

UNITED STATES PATENT OFFICE.

GLEN AKERS, OF ROANOKE, VIRGINIA, ASSIGNOR TO JENNINGS AUTOMATIC DUMP BODY, INC., OF ROANOKE, VIRGINIA, A CORPORATION OF VIRGINIA.

END-GATE-OPERATING MECHANISM.

1,394,521. Specification of Letters Patent. Patented Oct. 25, 1921.

Application filed December 1, 1919. Serial No. 341,793.

*To all whom it may concern:*

Be it known that I, GLEN AKERS, a citizen of the United States of America, and resident of Roanoke, county of Roanoke, and State of Virginia, have invented certain new and useful Improvements in End-Gate-Operating Mechanisms, of which the following is a specification.

This invention relates broadly to dump bodies for trucks and the like, and more specifically to end-gate operating means for dump bodies.

The primary object of the invention is to provide, in association with a manually operated device for shifting a truck body to an inclined dumping position, means whereby the end-gate is actuated to open simultaneously with the body shifting movement.

A further object is to provide a device of the character mentioned which may be adjusted to open the end-gate to any predetermined extent desired, adapting the truck for use as a spreader of the material conveyed thereby and for accurately regulating the rate of discharge of said material.

In describing the invention in detail, reference is herein had to the accompanying drawings, in which—

Referring to the drawings, in which like designating characters distinguish like parts throughout the several views—

Figure 2:
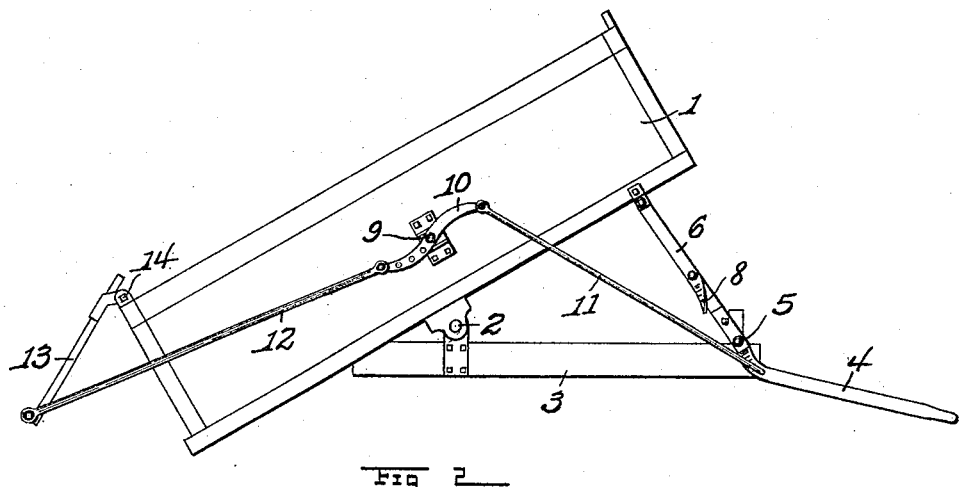
Fig. 2 is a similar view showing the body in dumping position with the end-gate extended to wide-open position; and—
Figure 3:
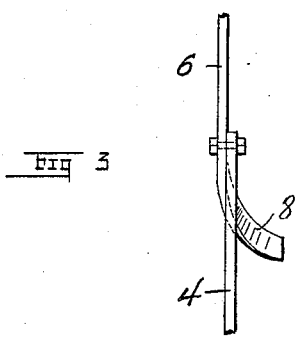
Fig. 3 is a detail front elevation of the coupled end portions of the manually operated body dumping lever and the link by which said lever is connected to the truck body.

1 indicates a truck body which is pivotally mounted intermediate its ends upon a suitable part of the truck frame, as upon a transverse shaft 2 carried by longitudinally disposed sills 3. A lever 4, preferably angular in form, is pivoted intermediate its ends upon the frame or other suitable stationary part of the truck, as shown at 5. The lower end of said lever is pivotally connected to a link 6 at a point adjacent to the lower end of the latter, and said link has its opposite end pivoted to the under side of the truck body adjacent to the front end of the same. Obviously, upon the application of forwardly and downwardly directed force to the upper end of said lever 4, the body 1 will be actuated through said lever and the link 6 to rock back upon its mounting to the inclined dumping position shown in Fig. 2, said lever and said link taking the positions shown in said figure.

The extreme lower end of the link 6 may be formed to provide a stop whereby the link and adjacent end of the lever are interlocked to prevent relative movement thereof in dumping direction beyond a point in which they occupy positions in substantial alinement. This stop may be constituted by a laterally disposed lip or laterally turned end 8 formed on the link and adapted to have an adjacent portion of the lever abut thereagainst when the aforesaid alined relation is assumed.

Figure 1:
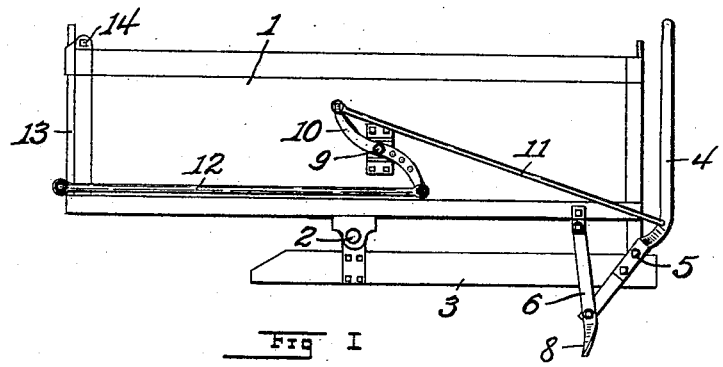
Figure 1 is a side elevation of a dump body equipped with my invention and showing the parts occupying their normal positions.

Mounted intermediate its ends upon a pivot member 9 carried by a side of the truck body at a suitable point intermediate the ends of the latter is a rocker arm 10 which, in the normal upright position of said body, is inclined in an upward and rearward direction, extending from a point adjacent to the bottom of the body in front of its pivotal mounting to a point rearward of said mounting. Pivotally connected to the upper end of said rocker arm is the rear end of a link-like rod 11 which has its opposite, or front, end in like manner connected to the lever 4 at a suitable distance above the pivot upon which it is mounted. Pivotally connected to the lower end of said rocker arm is the front end of a link-like rod 12 which extends rearwardly and has its opposite end pivotally attached to an end of an end-gate 13 at a point adjacent to the lower edge of the latter. Said end-gate has its upper portion or edge pivoted or hinged in any suitable manner to the truck body, as shown at 14, and is adapted to be swung to and from closing relation to the rear end of said body through the mechanism just described which is actuated simultaneously with actuation of the body to inclined dumping position in a manner which is made clearly apparent by inspection of Figs. 1 and 2 of the drawings.

It will be manifest that the extent to which the end-gate may be opened may be varied by employing interchangeable rocker arms of different lengths. For instance, if it is desired that the truck be employed as a spreader of the material conveyed, which requires that the end-gate be opened to a limited extent only, a relatively shorter rocker arm is employed; or shorter links 11 and 12 may be employed with their ends attached to the rocker arm at relatively less distances from the pivot upon which the latter is mounted.

What is claimed is:—

1. The combination with a dump body for trucks and the like having an end-gate pivoted at its upper edge to the rear end of said body, of an operating lever whereby said body may be actuated to move to and from inclined dumping position, a rocker arm pivoted intermediate its ends upon said body at a point intermediate the ends of the latter, a link connecting one end of said rocker arm to the lower portion of said end-gate, and a link connecting the other end of said rocker arm to said lever, whereby movement of said lever for actuating said body to rock to dumping position simultaneously swings said end-gate to and retains it in open dumping position, and vice versa.

2. In a dump body for trucks and the like comprising a body pivotally mounted upon the frame of a truck, an end-gate pivoted at its upper edge to the rear end of said body, a downwardly extending link pivoted at its upper end to the front end of said body, a lever pivotally mounted intermediate its ends upon the truck frame and having its lower end pivotally attached to the lower end of said link, a rocker arm pivotally mounted intermediate its ends upon said body, a rod connecting one end of said rocker arm to said lever, and a second rod connecting the other end of said rocker arm to the lower end of said end-gate.

3. In a dump body for trucks and the like comprising a body pivotally mounted upon the frame of a truck, an end-gate pivoted at its upper edge to the rear end of said body, a downwardly extending link pivoted at its upper end to the front end of said body, a lever pivotally mounted intermediate its ends upon the truck frame and having its lower end pivotally attached to the lower end of said link in such manner that depression of the upper end of said lever will elevate the front end of said body, means preventing depression of said lever beyond a certain point, a rocker arm pivotally mounted intermediate its ends upon said body, a rod connecting one end of said rocker arm to said lever intermediate its pivot and its upper end, and a second rod connecting the other end of said rocker arm to the lower end of said end-gate, said mechanism enabling the body to be rocked to dumping position and the end-gate to be swung open and held in open position by depressing the upper end of said lever, and vice versa.

4. In a dump body for trucks and the like comprising a body pivotally mounted near the middle thereof upon the frame of a truck, an end-gate pivoted at its upper edge to the rear end of said body, a downwardly extending link pivoted at its upper end to said body near its front end, a lever pivotally mounted intermediate its ends upon the truck frame and having its lower end pivotally attached to the lower end of said link in such manner that forward and downward movement of the upper end of said lever will rock said body to dumping position, the lower end of said link being formed to provide a stop for preventing relative movement of said lever and said link in a dumping direction beyond a point in which they occupy positions in substantial alinement, a rocker arm pivotally mounted intermediate its ends upon said body, a rod connecting one end of said rocker arm to said lever intermediate its pivot and its upper end, and a second rod connecting the other end of said rocker arm to the lower end of said end-gate, the ends of said rods being adapted to be attached to said rocker arm at various points intermediate the pivot and the ends thereof for varying the relative distances traveled by said rods when said rocker arm is partially rotated, said mechanism enabling said body to be rocked to dumping position and the end-gate simultaneously swung open and held in open position by depressing the upper end of said lever, and vice versa.

In testimony whereof, I affix my signature in presence of two subscribing witnesses.

GLEN AKERS.

Witnesses:
W. W. CLARK,
BLAKE TAYLOR.